US007498689B2

United States Patent
Mitani et al.

(10) Patent No.: US 7,498,689 B2
(45) Date of Patent: Mar. 3, 2009

(54) POWER SUPPLY DEVICE FOR VEHICLE

(75) Inventors: Yosuke Mitani, Takatsuki (JP); Toshihiko Ohashi, Hirakata (JP)

(73) Assignee: Panasonic Corporation, Osaka (JP)

( * ) Notice: Subject to any disclaimer, the term of this patent is extended or adjusted under 35 U.S.C. 154(b) by 653 days.

(21) Appl. No.: 10/523,556

(22) PCT Filed: Jun. 24, 2004

(86) PCT No.: PCT/JP2004/009286

§ 371 (c)(1),
(2), (4) Date: Feb. 1, 2005

(87) PCT Pub. No.: WO2005/000656

PCT Pub. Date: Jan. 6, 2005

(65) Prior Publication Data
US 2005/0269170 A1 Dec. 8, 2005

(30) Foreign Application Priority Data
Jun. 26, 2003 (JP) ............... 2003-182299

(51) Int. Cl.
H02J 1/10 (2006.01)
H02J 9/00 (2006.01)
(52) U.S. Cl. .............. 307/21; 307/19; 307/23; 307/25; 307/44; 307/48
(58) Field of Classification Search ............... 307/10.7, 307/18, 19, 21, 23, 25, 44, 48
See application file for complete search history.

(56) References Cited
U.S. PATENT DOCUMENTS
5,045,835 A * 9/1991 Masegi et al. ............... 340/438
5,373,226 A * 12/1994 Kimura ..................... 323/313
6,652,001 B2 * 11/2003 Furui ......................... 280/735
2002/0158513 A1 10/2002 Amano et al.

FOREIGN PATENT DOCUMENTS

| EP | 1 253 698 A2 | 10/2002 |
| EP | 1 285 835 A2 | 2/2003 |
| JP | 05-116571 A | 5/1993 |
| JP | 2000-312444 A | 11/2000 |
| JP | 2001-114039 | 4/2001 |
| JP | 2003-048530 A | 2/2003 |

OTHER PUBLICATIONS

Japanese language International Search Report for PCT/JP2004/009286, dated Sep. 21, 2004.
European Search Report for Application No. EP 04 74 6755 dated Dec. 13, 2006.

* cited by examiner

Primary Examiner—Stephen W Jackson
Assistant Examiner—Hal I Kaplan
(74) Attorney, Agent, or Firm—RatnerPrestia

(57) ABSTRACT

A power supply device for vehicles is disclosed, which device includes a backup unit to the power supply as an auxiliary power supply employing a capacitor unit formed of plural capacitors. The auxiliary power supply includes a power supply section allowing the capacitor unit to power an electronic controller, and a compulsory operating section for operating the power supply section. An operating status of the power supply section is monitored even when a battery operates normally, so that the power supply device for vehicles with higher reliability and improved safety is obtainable.

9 Claims, 2 Drawing Sheets

POWER SUPPLY DEVICE FOR VEHICLE

This application is a U.S. National Phase Application of PCT International Application PCT/JP2004/009286.

TECHNICAL FIELD

The present invention relates to a power supply device to be mounted to a vehicle such as a hybrid car or an electric vehicle, more particularly, it relates to a power supply device for electrically braking the vehicle.

BACKGROUND ART

Development of hybrid cars and electric vehicles has progressed rapidly, which entails the rapid development of electrical brakes.

An electrical application of a brake in a vehicle generally uses a battery as a power source. In such a case, if the battery fails to supply power due to some reason, the brake cannot be applied. Therefore, an auxiliary battery independent of the main battery is included in the vehicle as an auxiliary power supply.

Japanese Patent Application Non-Examined Publication No. H05-116571 discloses prior art to the present invention.

In such a power supply device for vehicles, since the auxiliary power supply is responsible for braking the vehicle when the main battery fails, it is critical to supply power to the auxiliary power supply without fail at an emergency. Therefore, it is important to predict the service life of the auxiliary power supply accurately and keep detecting the status of the auxiliary power supply.

However, if a battery is used as the auxiliary power supply, it is difficult to predict the service life of this battery. While voltage of the battery can be monitored, it is difficult to detect battery abnormality by only monitoring voltage. Thus the battery has been replaced periodically with a new one ahead of time so that the safety can be more positively ensured. The periodical replacement of the battery ahead of time is somewhat effective; however, it is difficult to monitor the status of the battery everyday or every time when a user starts the vehicle. Further improvement is thus demanded.

SUMMARY OF THE INVENTION

The power supply device for vehicles of the present invention comprises the following elements:
- an electronic controller for receiving at least one of first information supplied from a brake pedal or second information in response to a driving state of the vehicle, and supplying information to the brake for controlling the vehicle based on the foregoing first and second information;
- a battery for supplying electric power to the brake via the electronic controller; and
- an auxiliary power supply for supplying electric power to the brake via the electronic controller when the battery encounters an abnormality.

This auxiliary power supply includes a capacitor unit formed of plural capacitors, a power supplying section that allows the capacitor unit to supply power not only in case of an abnormality but also during normal operation of the battery, and a compulsory operating section for operating forcefully the power supply section. The foregoing structure allows operation of the power supply section to be monitored when the battery operates normally.

The use of the capacitor unit in the auxiliary power supply substantially prolongs the service life of the auxiliary power supply to an extent similar to the durability life of the vehicle. As a result, the auxiliary power supply using capacitor unit can be maintenance-free as a backup unit to the power supply. The presence of the power supply section, which allows the capacitor unit to supply power, can monitor the operation of the power supply section during normal operation, thereby monitoring whether or not the power is supplied from the capacitor unit to the electronic controller.

PREFERRED EMBODIMENT OF THE INVENTION

An exemplary embodiment of the present invention is demonstrated hereinafter with reference to the accompanying drawings.

Figure 1:
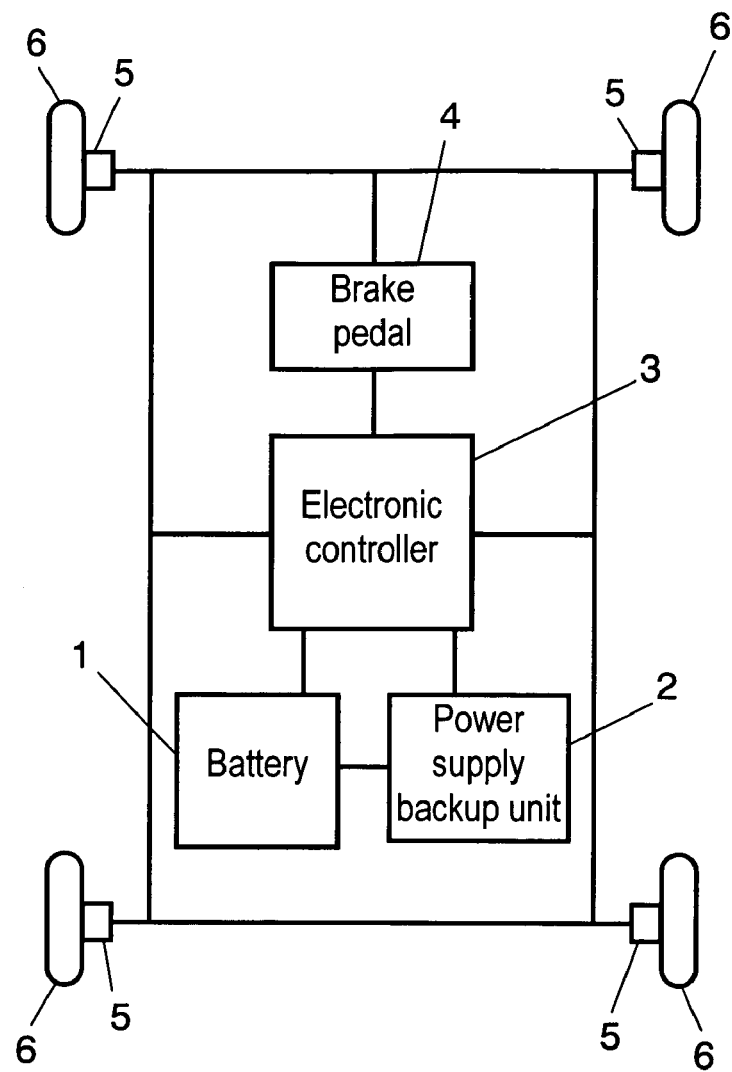
FIG. 1 shows a structure of a power supply device for vehicles in accordance with an exemplary embodiment of the present invention.

FIG. 1 shows a structure of a power supply device for vehicles in accordance with this exemplary embodiment of the present invention. In FIG. 1, 12V-battery 1 supplies power into the vehicle, and backup power supply unit 2 is prepared as an auxiliary power supply to battery 1. Electronic controller 3 outputs information for controlling a brake of the vehicle. Both of battery 1 and backup unit 2 supply power to electronic controller 3. Brake pedal 4 conveys the information for controlling the brake of the vehicle to electronic controller 3. Based on the information supplied from brake pedal 4, controller 3 controls brake 5, which applies a brake to tires 6.

Figure 2:
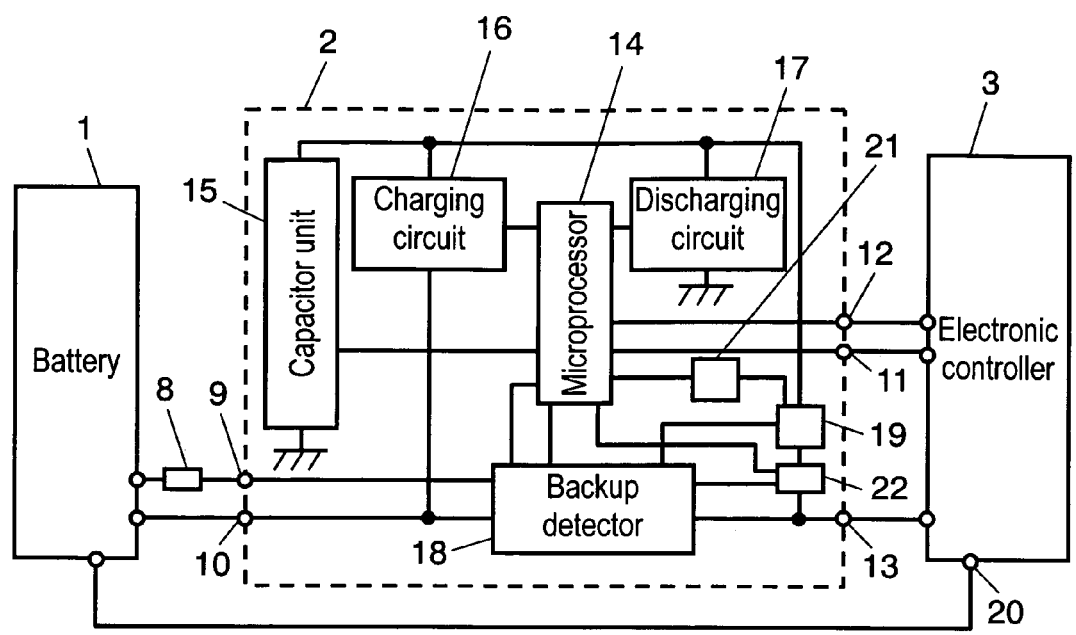
FIG. 2 shows a circuit diagram of a power supply device for vehicles in accordance with an exemplary embodiment of the present invention.

The structure of the power supply device for vehicles in accordance with the exemplary embodiment of the present invention is detailed hereinafter. FIG. 2 shows a circuit diagram of the power supply device for vehicles. In FIG. 2, battery 1 is coupled to ignition generator (IG) terminal 9 disposed on backup unit 2 via ignition switch 8. Battery 1 is also coupled to +BC terminal 10 disposed on backup unit 2. The +BC terminal 10 is used for supplying power to backup unit 2, and ignition switch 8 is used for starting or ending the operation of the vehicle. Battery 1 is coupled to power supply terminal 20 which supplies power to electronic controller 3.

Backup unit 2 is coupled to electronic controller 3 via communication input terminal 11, communication output terminal 12 and OUT terminal 13. Input terminal 11 is used for inputting a signal from controller 3 to backup unit 2. Output terminal 12 is used for outputting a signal from backup unit 2 to controller 3. OUT terminal 13 is used for outputting a voltage detected by a backup detector 18 disposed in backup unit 2, or for outputting electric charges stored in backup unit 2 when battery 1 encounters an abnormality.

A structure of power supply backup unit 2 is described hereinafter. Backup unit 2 is an auxiliary power supply for supplying power to brake 5 via electronic controller 3 when battery 1 operates abnormally. Backup unit 2 includes capacitor unit 15 which is formed of plural capacitors, e.g. plural electrical double-layer capacitors quickly chargeable. Backup unit 2 includes charging circuit 16 for charging the capacitor unit 15, and discharging circuit 17 for discharging. Those efforts discussed above are controlled based on an instruction from microprocessor 14.

Power supply backup unit 2 further includes backup detector 18 which detects a voltage applied by battery 1. Backup unit 2 also includes power supply section 19 which allows capacitor unit 15 to discharge to electronic controller 3 via OUT terminal 13 when backup detector 18 detects an abnormal voltage.

Backup unit 2 includes compulsory operating section 21 which temporarily operates power supply section 19, even when battery 1 works normally, according to the instruction from microprocessor 14 in order to monitor the operating status of power supply section 19. Backup unit 2 also includes output detector 22 which detects an output from power supply section 19 and informs microprocessor 14 of the detection.

An operation of the power supply device for vehicles is demonstrated. First, in order to start the vehicle working, e.g. turn on the ignition, then ignition switch 8 coupled between battery 1 and IG terminal 9 is turned on. Battery 1 starts supplying +12V to backup unit 2 and electronic controller 3. Controller 3 inputs a charge permitting signal to microprocessor 14 disposed in backup unit 2 via communication input terminal 11 for permitting battery 1 to charge capacitor unit 15. Microprocessor 14 receives the permitting signal and instructs charging circuit 16 to permit a charge. Then battery 1 charges capacitor unit 15 via +BC terminal 10 and charging circuit 16. The charge stored in capacitor unit 15 is to be supplied to electronic controller 3 when battery 1 lowers its voltage or encounters an abnormality.

On the other hand, the voltage applied by battery 1 via +BC terminal 10 is detected by a sensor disposed in backup detector 18, and the voltage is supplied to OUT terminal 13. If this voltage applied by battery 1 is not lower than a reference value (9.5V), battery 1 keeps on supplying power to electronic controller 3 after confirming that battery 1 outputs a normal voltage and backup unit 2 works normally.

The foregoing mechanism allows the vehicle to work properly. During a proper driving of the vehicle, when brake pedal 4 shown in FIG. 1 is operated, electronic controller 3 receives information from pedal 4, and based on the information, controller 3 supplies information for controlling the brake of the vehicle to brake 5, which then works according to the information supplied, thereby positively applying a brake to tires 6. As a result, the vehicle can be controlled with reliability.

When ignition switch 8 is turned off, battery 1 stops supplying power. At this time, microprocessor 14 transmits a signal, which instructs a discharge of electric charges stored in capacitor unit 15, to discharging circuit 17. Based on the signal, circuit 17 discharges the electric charges stored in capacitor unit 15.

An operation of the power supply device for vehicles when battery 1 lowers its voltage or encounters an abnormality is demonstrated hereinafter.

When the vehicle starts working, battery 1 charges electric charges into capacitor unit 15. Backup detector 18 detects a voltage applied to backup unit 2 by battery 1. Power supply backup unit 2 outputs the detected voltage from OUT terminal 13, so that battery 1 supplies power to electronic controller 3. Backup detector 18 includes a sensor for detecting an abnormality of battery 1. When the sensor detects a voltage lower than a reference value (9.5V), detector 18 can detect that battery 1 outputs an abnormal voltage.

Based on the detection of an abnormality, power supply section 19, which stays basically turned-off during a normal operation of battery 1, is turned on. Capacitor unit 15 is thus ready to discharge to OUT terminal 13, and battery 1 stops supplying power. Backup detector 18 outputs a signal corresponding to the stop of supplying the power from battery 1 to microprocessor 14, which then instructs discharging circuit 17 to discharge electric charges stored in capacitor unit 15. This instruction allows supplying the electric charges stored in capacitor unit 15 to electronic controller 3 via power supply section 19 and OUT terminal 13. Meanwhile when battery 1 encounters an abnormality, monitoring the operation of power supply section 19 is not carried out.

The information of abnormality is transmitted from microprocessor 14 to electronic controller 3 via communication output terminal 12, so that a display unit in the vehicle can indicate that battery 1 operates abnormally. The display instructs the driver to stop immediately the vehicle. As discussed above, when battery 1 encounters an abnormality, since the electric charges stored in capacitor unit 15 as an emergency power source are supplied to electronic controller 3, the driver can operate brake 5 via controller 3 by depressing brake pedal 4. As a result, the vehicle can be stopped safely.

Next, a method of monitoring an operation of power supply section 19 is demonstrated hereinafter. During the normal operation of battery 1, when a battery voltage is not lower than a given value (10V), an operation of power supply section 19 can be monitored in the following way: Microprocessor 14 transmits a signal for monitoring the operation, then via compulsory operating section 21 forcibly starts power supply section 19 to operate. It is desirable for power supply section 19 to operate for as short a time as possible for minimizing the consumption of electric charges stored in capacitor unit 15. For this reason, power supply section 19 desirably employs elements having a fast switching speed, such as a field-effect transistor (FET).

Power supply section 19 starts operating and when its output becomes stable, e.g. in 18 milliseconds after starting the operation, output detector 22 detects an output voltage or an output current from capacitor unit 15. Detector 22 transmits the information about the operating status to microprocessor 14 for monitoring whether or not power supply section 19 operates normally based on the information detected.

Then the output voltage or output current detected by detector 22 is compared with a given reference voltage or a given reference current. Based on the comparison, whether or not the output voltage or output current has been accurately detected is monitored, so that it is determined whether or not power supply section 19 is defective.

To be more specific, when the output voltage or output current detected is greater than the given reference voltage or current, it is determined that power supply section 19 operates normally. Then power supply section 19 is forcibly operated at intervals of every one-second for monitoring the operation of power supply section 19.

On the contrary, when the output voltage or output current detected is smaller than the given reference voltage or current, it is determined that power supply section 19 operates abnormally. The information about the abnormality is transmitted from microprocessor 14 to electronic controller 3 via communication output terminal 12. The abnormality of power supply section 19 is displayed in the vehicle, this is similar to the case of abnormality of battery 1, thereby notifying the driver of the abnormality.

It is described that output detector 22 detects an output voltage or an output current from capacitor unit 15; however, detector 22 can detect both of the voltage and current.

In this embodiment, during the abnormality of battery 1, monitoring the operation of power supply section 19 is halted. Even if battery 1 operates normally, when the voltage of battery 1 is not higher than the voltage of capacitor unit 15, monitoring the operation of power supply section 19 is halted in order to prevent the electric charges from flowing to battery 1.

During the abnormality of power supply backup unit 2, monitoring the operation of power supply section 19, namely, monitoring whether power supply section 19 is defective, can be halted.

If an abnormality such as a disconnection or a short is found in the wire between backup unit 2 and electronic controller 3, monitoring of operation of power supply section 19 is halted for protecting the circuits in backup unit 2 as well as preventing malfunction. Those abnormalities are transmitted to electronic controller 3 via communication output terminal 12 for displaying the abnormality in the vehicle, thereby notifying the driver of the abnormality.

As discussed above, according to the exemplary embodiment of the present invention, an auxiliary power supply is prepared for powering electronic controller 3 of a vehicle. The auxiliary power supply comprises capacitor unit 15, and monitors an operation of power supply section 19 even when battery 1 operates normally for making sure that power supply section 19 can operate normally. Those preparations allow monitoring the availability of power supply from capacitor unit 15, and if battery 1 operates abnormally, backup detector 18 detects this abnormality, so that capacitor unit 15 powers electronic controller 3. The reliability of the backup unit to the power supply is thus increased, and as a result, a power supply device for vehicles with improved safety is thus obtainable.

In the embodiment discussed above, electronic controller 3 receives information supplied from brake pedal 4, and based on the information, controller 3 outputs information to brake 5 about controlling the brake of the vehicle. However, electronic controller 3 can receive the information in response to the driving status of the vehicle, or receive both of the information supplied from the brake pedal and in response to the driving status of the vehicle.

As discussed above, according to the present invention, an auxiliary power supply is prepared for powering an electronic controller of a vehicle. Because the auxiliary power supply comprises capacitor unit 15, when the battery (main power supply) encounters an abnormality, the auxiliary power supply positively powers the electronic controller. Ensuring the operation of a power supply section around the clock results in obtaining a power supply backup unit with higher reliability, and as a result, a power supply device for vehicles with improved safety is obtainable.

INDUSTRIAL APPLICABILITY

A power supply device for vehicles is disclosed, which device includes a power supply backup unit as an auxiliary power supply comprising a capacitor unit formed of plural capacitors. The auxiliary power supply includes a power supply section which allows the capacitor unit to power an electronic controller, and a compulsory operating section for operating the power supply section. An operation status of the power supply section is monitored even when the battery operates normally, so that the power supply device for vehicles with higher reliability and improved safety is obtainable. This power supply device is used for applying a brake to a vehicle by electrical control, so that this power supply device can be mounted to, e.g. hybrid cars or electric vehicles.

The invention claimed is:

1. A power supply device for a vehicle comprising:
   an electronic controller for receiving at least one of information supplied from a brake pedal and information in response to a driving status of the vehicle, and for outputting information to a brake about braking the vehicle based on the information received by the electronic controller;
   a battery for powering the brake via the electronic controller; and
   an auxiliary power supply for powering the brake via the electronic controller when the battery encounters an abnormality,
   wherein the auxiliary power supply includes a capacitor unit formed of a plurality of capacitors, a power supply section for allowing the capacitor unit to power the electronic controller when the battery operates not only abnormally but also normally, and a compulsory operating section for operating the power supply section, wherein the power supply section is operated for a given time and an operating status of the power supply section is monitored during a normal operation of the battery.

2. The power supply device for a vehicle as defined in claim 1, wherein monitoring the operating status of the power supply section is halted when one of the battery and the auxiliary power supply operates abnormally.

3. The power supply device for a vehicle as defined in claim 1 further comprising an output detector for detecting at least one of an output voltage and an output current from the capacitor unit, wherein the output detector is used for monitoring the operating status of the power supply section.

4. The power supply device for a vehicle as defined in claim 3, wherein the output detector detects at least one of the output voltage and the output current from the capacitor unit in a given time after the power supply section starts operating.

5. The power supply device for a vehicle as defined in claim 3, wherein whether or not the power supply section is defective is determined by at least one of a comparison of an output voltage detected by the output detector after the power supply section operates for a given time with a given reference voltage and a comparison of an output current detected by the output detector after the power supply section operates for a given time with a given reference current.

6. The power supply device for a vehicle as defined in claim 5, wherein a determination about whether or not the power supply section is defective is carried out periodically.

7. The power supply device for a vehicle as defined in claim 5, wherein when the determination finds that the power supply section operates abnormally, information about the abnormality is supplied to the electronic controller.

8. The power supply device for a vehicle as defined in claim 5, wherein when the battery outputs a normal voltage but the voltage is not higher than a voltage of the capacitor unit, the determination about whether or not the power supply section is defective is not carried out.

9. The power supply device for a vehicle as defined in claim 1, wherein the power supply section is formed of a field effect transistor.

* * * * *